United States Patent Office 3,310,372
Patented Mar. 21, 1967

3,310,372
PROCESS FOR THE MANUFACTURE OF ALKA-
LINE EARTH METAL PYROPHOSPHATES
Felix Wright, Kirkwood, and Tom Dolan, Des Peres,
Mo., assignor to Monsanto Company, a corporation of
Delaware
No Drawing. Filed Mar. 18, 1963, Ser. No. 266,014
5 Claims. (Cl. 23—108)

This invention relates to the manufacture of alkaline earth metal pyrophosphates. More particularly, the present invention relates to novel calcining processes for manufacturing an improved dentifrice grade of such pyrophosphates.

The advantages that result from the utilization of dentifrice cleansing and polishing compositions (such as toothpastes and toothpowders) containing fluorides and stannous compounds in combination with alkaline earth metal pyrophosphates are well known. In order for these dentifrice compositions to retain their therapeutic efficacy over a prolonged period of time after they have been manufactured, it is known that the pyrophosphate polishing agent must have a high degree of compatibility with the stannous and fluoride ions in the dentifrice compositions. Although the alkaline earth metal pyrophosphates (such as calcium pyrophosphate) that are manufactured via conventional processes can be utilized to a certain extent in combination with stannous and fluoride compounds in dentifrice compositions, their use in such compositions is not especially desirable in instances where the compositions should have extremely prolonged shelf lives. This is because upon such prolonged storage, the conventional alkaline earth pyrophosphate polishing agents in the dentifrice compositions react with the stannous and fluoride ions, so that their therapeutic value in protecting teeth against decay is lost. Since this ability, or the more desirable inability, of alkaline earth metal pyrophosphates to react with dissolved stannous and fluoride ions is spoken of in terms of compatibility of the particular pyrophosphate compound with such dissolved ions, it can readily be appreciated that generally the more compatible a particular pyrophosphate material is, the more valuable and useful is the material in therapeutic dentifrice compositions that also contain soluble stannous and/or fluoride compounds.

However, compatibility is not the sole essential criterion for judging acceptably useful dentifrice abrasives. The "compatible" abrasives must also have a sufficiently low abrasiveness toward teeth (herein termed "degree of abrasiveness"), so that dentifrice compositions containing them do not erode teeth enamel at an excessively high rate.

It is a major object of the present invention to provide novel processes for the manufacture of improved dental abrasive grade alkaline earth metal pyrophosphates, which pyrophosphates have unexpectedly high compatibility with stannous and fluoride ions, as well as an acceptably low degree of abrasiveness.

These objects, as well as others which will become apparent from the following description and claims, can be achieved by manufacturing the alkaline earth metal pyrophosphate products via calcining processes (wherein an appropriate alkaline earth metal orthophosphate composition is molecularly dehydrated) in which an effectively humidified atmosphere over the reacting (molecularly dehydrating) orthophosphate composition is utilized.

In accordance with the processes of this invention, an effectively humidified atmosphere is one in which the water vapor content is equal to at least about 8.5 volume percent, including atmospheres that consist practically entirely of water vapor. For optimum results, however, it is preferred that the calciner atmosphere in the molecularly dehydrating (calcining) step of the overall processes of this invention have water vapor contents equal to from about 10 to about 60 volume percent.

Although any of the alkaline earth metal pyrophosphate compounds can be manufactured via the processes of this invention, the benefits resulting therefrom can best be appreciated when calcium pyrophosphate is the product resulting from these processes. Similarly, optimized results can most readily be obtained when either dicalcium orthophosphate dihydrate ($CaHPO_4 \cdot 2H_2O$) or dehydrated dicalcium orthophosphate dihydrate, or mixtures thereof is the "raw" material used in these processes. Therefore, processes involving the molecular dehydration of one of these "raw" materials in an effectively humidified atmosphere in the manufacture of calcium pyrophosphate constitute a preferred embodiment of this invention.

Effectively humidified atmospheres over the reacting (molecularly dehydrating) di-alkaline earth metal orthophosphate can be obtained and maintained during at least the greater portion of the calcining step by any of, or any combination of, several specific methods, although the particular manner in which these effectively humidified atmospheres are obtained and maintained is not believed critical for the successful practice of the invention. For example, when the molecular dehydration occurs in a direct-fired rotary calciner such as those presently conventionally used in the manufacture of calcium pyrophosphate from dicalcium orthophosphate, the atmosphere in the calciner can be effectively humidified by injecting steam, either along with the inlet air entering the calciner, or in place of such inlet air. Processes involving the introduction of water, preferably in the form of steam, at various and/or several places in a direct fired rotary calciner, represent another preferred embodiment of this invention.

Appropriate alkaline earth metal orthophosphate materials that can be used in the conventional manufacture of their corresponding alkaline earth metal pyrophosphates via calcination procedures involving the molecular dehydration of said orthophosphate materials are well known in the art and need not be extensively detailed herein. They include, for example, dimagnesium orthophosphate, dicalcium orthophosphate, dibarium orthophosphate, and the like, as well as any of their hydrated forms. These same materials can be used as raw materials in the calcining processes of the present invention. Preferably, the di-alkaline earth metal orthophosphate "raw" materials used in the practice of this invention should consist of practically pure di-alkaline earth metal orthophosphate compounds, containing at most about 10 weight percent, and preferably at most about 5 weight percent, of "impurities" (i.e., materials other than molecularly dehydratable alkaline earth metal orthophosphates and pyrophosphates).

In the formulation of finished dentifrice compositions in which the alkaline earth metal pyrophosphates of this invention are utilized, it is generally preferred that auxiliary agents be utilized that do not precipitate, complex, or otherwise react with stannous or fluoride ions. Toothpastes, for example, generally contain a sweetener such as saccharin, a flavoring agent, a humectant, a sudsing agent, and a binding agent. Generally most conventional auxiliary agents are compatible with fluoride and stannous ions. For example, glycerine and sorbitol are excellent humectants for use in toothpastes in accordance with the present invention. Typically good binders are the very high molecular weight polyethylene oxides, hydroxyethylcellulose, and carboxymethylcellulose. Nonionic sudsing agents such as the condensation product of tridecal alcohol with from 3–10 moles of ethylene oxide and sucrose monolaurate are also preferred.

In toothpastes, the level of alkaline earth metal pyrophosphate that is utilized generally varies from about 20 to about 60 weight percent, and preferably varies from about 30 to about 45 weight percent, of the composition. In tooth powders, generally higher amounts of the abrasive agent, often up to about 95 weight percent, are utilized. The amounts of stannous ions that should be utilized in dentifrice compositions (in which the alkaline earth metal pyrophosphates of this invention can be utilized to advantage) generally varies from about 1000 p.p.m. to about 10,000 p.p.m., and is preferably within the range of from about 2000 to about 5000 p.p.m. Generally fluoride ions should be present or available in these dentifrice compositions at levels of from about 25 to about 4000 p.p.m.; or even higher levels, if desired; and should preferably be present therein at levels of from about 500 to about 2500 p.p.m.

Typical sources of stannous ions for use in the above-described dentifrice compositions include stannous fluoride, mixed stannous halides such as $Sn_2ClF_3$ and $SnClF$, as well as the fluorostannites. Fluoride ions in these dentifrice compositions can be derived from practically any water-soluble, relatively innocuous compound that can provide fluoride ions when it is dissolved in water. For example, they can be derived from water-soluble "simple" inorganic fluorides such as sodium fluoride, potassium fluoride, lithium fluoride, ammonium fluoride, indium fluoride, palladium fluoride, ferrous fluoride, cuprous fluoride, and the like, as well as from water-soluble fluoride containing complexes such as sodium and potassium fluorosilicates, fluorozirconates, fluoroborates and fluorotitanates, and mixtures thereof.

In the following examples, which are illustrative of some of the preferred embodiments of the present invention, all parts are by weight unless otherwise stated.

EXAMPLE I

Into a direct natural gas fired, countercurrent, conventional rotary calciner are charged continuously 10,000 parts per hour of finely divided (—200 mesh) dicalcium orthophosphate dihydrate. The temperature of the calciner's inlet gas is about 820° C., while the temperature of the exit gas is about 290° C. A total volume of 650 standard cubic feet per minute of gas is passed through the calciner. The water vapor content of the inlet gas is maintained equal to between about 30 and 32 volume percent by injecting steam into the inlet gas stream just before the gas stream enters the calciner. The phosphate materials remain in the revolving calciner for about 50 minutes, during which time their temperature is increased to about 775° C., at which point, being completely molecularly dehydrated, they are removed from the calciner and allowed to cool to ambient temperatures. The calcined product, calcium pyrophosphate, is found to be about 55% compatible with stannous ions and 70% compatible with fluoride ions. It is also found to have an acceptable (for use in therapeutic dentifrice compositions) degree of abrasiveness.

By comparison, when a similar dicalcium orthophosphate dihydrate material is calcined under otherwise identical conditions, except under ambient atmospheric conditions in the calciner (e.g., water vapor content varying from about 5.8 volume percent on a dry day, to about 8 volume percent on a very humid day), the compatibility with stannous and fluoride ions of the resulting calcium pyrophosphate product are only about 38% ($Sn^{++}$) and about 52% ($F^-$), respectively.

EXAMPLE II

Twenty-thousand parts of finely divided dicalcium orthophosphate dihydrate are charged batchwise into a conventional stainless steel indirectly-fired rotary calciner. Then, while the calciner is revolving at a rate of 10 times per minute, and over a period of about 60 minutes, the temperature of the phosphate materials in the calciner is raised gradually to about 750° C., at which point they are removed from the calciner and allowed to cool to ambient temperature. During this heating step, the materials are heated by means of gas burners, fixed so that they directly heat the outside wall of the calciner, to thereby indirectly heat the reacting phosphate materials inside the calciner.

During the heating period, care is taken to prevent the introduction of dry air into the calciner, and to prevent the excessive removal of moist, humidified air from the interior of the calciner. (The air in the calciner becomes humidified in this instance by the forced removal of the water of crystallization from the $DCP.2H_2O$ during the early stages of the heating period, and subsequent retention of the resulting humidified air in the calciner). At the time the calcium phosphate product is removed from the calciner, the water vapor content in the atmosphere (in the calciner) over the product is equal to about 50 volume percent.

After being cooled to room temperature, the product resulting from the process of Example II is found to be 60% compatible with stannous ions, 75% compatible with fluoride ions, and has an acceptable degree of abrasiveness.

EXAMPLE III

The process described in Example I, above, is repeated, except that in place of the dicalcium orthophosphate dihydrate, 8,000 parts per hour of precipitated anhydrous dicalcium orthophosphate are charged continuously into the tumbling rotary calciner. The product resulting therefrom (calcium pyrophosphate) is found to be 65% compatible with stannous ions, 79% compatible with fluoride ions. This is significantly better compatibility than is demonstrated by similarly treated anhydrous dicalcium orthophosphate which is calcined conventionally in the absence of an effectively humdified atmosphere (where no water vapor is added to the inlet air). Thus the conventionally calcined product has a stannous compatibility equal to about 30% and a fluoride compatibility equal to about 55%.

Although the foregoing examples have been directed to the preparation solely of calcium pyrophosphate, the manufacture of other alkaline earth metal pyrophosphates can be accomplished in a similar manner, merely by substituting the appropriate alkaline earth metal orthophosphate salts for the dicalcium orthophosphates in the foregoing examples, and maintaining the proper humidified atmosphere and temperatures during the calcining part of the processes by any convenient means.

Stannous ion and fluoride ion compatibility are determined by stirring continuously in a nitrogen-purged system, for one hour at about 26° C., 10 grams of the pyrophosphate product in 100 mls. of a 0.10 weight percent aqueous solution of stannous fluoride. Then the resulting slurry is centrifuged for two minutes to settle all of the solid materials, after which a small sample of the supernatant liquid is taken for analysis, to determine the amounts of stannous and fluoride ions remaining therein. Percent of compatibility is determined by comparing the amount of the particular ion found in the supernatant liquid with the amount that was originally mixed with the pyrophosphate product (corrected for sample size) in accordance with the formula:

$$\text{Percent compatibility} = \frac{\text{concentration of ions after test}}{\text{concentration of ions before test}} \times 100.$$

What is claimed is:
1. In a process for the manufacture of an alkaline-earth metal pyrophosphate, wherein a di-alkaline earth metal orthophosphate is heated in a calcining step to molecularly dehydrate substantially all of said orthophosphate, the improvement which comprises heating said di-alkaline earth metal orthophosphate in an atmosphere which contains from about 10% to about 60% by volume of water vapor.

2. The improved process as set forth in claim 1 wherein the water vapor is supplied in the calcining step in the form of steam.

3. A process for manufacturing calcium pyrophosphate which has utility as a polishing and abrasive agent in dentifrice compositions, which comprises heating and calcining a calcium phosphate selected from the group consisting of finely divided dicalcium orthophosphate dihydrate and precipitated anhydrous dicalcium orthophosphate, in an atomsphere containing from about 10% to about 60% by volume of water vapor supplied as steam, for a period of time and at a temperature sufficient to molecularly dehydrate said calcium phosphate to form calcium pyrophosphate characterized by having a stannous ion compatibility of at least 55% and has a fluoride ion compatibility of at least 70% determined pursuant to the procedure set forth in the specification.

4. The process as set forth in claim 3 wherein the water vapor content of the atmosphere is from about 30% to about 50% by volume and the calcining time is from about 50 minutes to about 60 minutes.

5. A process for manufacturing calcium pyrophosphate which has utility as a polishing and abrasive agent in dentifrice compositions, which comprises heating and calcining a calcium phosphate selected from the group consisting of finely divided dicalcium orthophosphate dihydrate and precipitated anhydrous dicalcium orthophosphate, in an atmosphere containing from about 30% to about 50% by volume of water vapor supplied as steam, for from about 50 minutes to about 60 minutes at a temperature of from about 750° C. to about 775° C. whereby said calcium phosphate is molecularly dehydrated to form calcium pyrophosphate characterized by having a stannous ion compatibility of from about 35% to about 65% and has a fluoride ion compatibility of from about 70% to about 79%, said compatibility being determined pursuant to the procedure set forth in the specification.

References Cited by the Examiner

UNITED STATES PATENTS

| | | | |
|---|---|---|---|
| 2,338,407 | 1/1944 | Coleman et al. | 23—108 X |
| 2,962,354 | 11/1960 | Edwards | 23—106 |
| 3,110,559 | 11/1963 | Bigot | 23—107 |
| 3,112,247 | 11/1963 | Schweizer | 67—93 |

OSCAR R. VERTIZ, *Primary Examiner.*

O. F. CRUTCHFIELD, *Assistant Examiner.*